(12) United States Patent
Tsai (10) Patent No.: US 6,516,101 B1
(45) Date of Patent: *Feb. 4, 2003

(54) IMAGE SCANNING DEVICE HAVING IMAGE DATA CORRECTION FUNCTION

(75) Inventor: Jenn-Tsair Tsai, Hsinchu (TW)

(73) Assignee: Mustek System, Inc. (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,092

(22) Filed: Oct. 9, 1997

(51) Int. Cl.[7] .............................. G06K 9/20; H04N 1/04
(52) U.S. Cl. ........................ 382/321; 382/312; 358/488
(58) Field of Search ................................ 382/312, 313, 382/315, 316, 317, 318, 319, 321, 322, 323, 324; 399/51; 355/69; 356/405, 223, 416, 419, 319, 325; 250/226, 205, 227.23, 343, 339.02, 340; 348/180, 178, 645, 679, 205; 358/521, 524, 494, 474, 406, 488, 496; 359/202, 221

(56) References Cited

U.S. PATENT DOCUMENTS 4,424,589 A * 1/1984 Thomas et al. ............. 382/317
4,449,821 A * 5/1984 Lee .............................. 356/319
4,841,360 A * 6/1989 Birgmeir ..................... 358/521
4,980,759 A * 12/1990 Smyth ......................... 358/500
5,081,523 A * 1/1992 Frazier ........................ 348/178
5,223,715 A * 6/1993 Taylor ......................... 250/343
5,239,175 A * 8/1993 Jawad et al. ................ 250/226
5,272,518 A * 12/1993 Vincent ....................... 356/405
5,907,742 A * 5/1999 Johnson et al. ............... 399/51

* cited by examiner

Primary Examiner—Andrew W. Johns
Assistant Examiner—Duy M. Dang
(74) Attorney, Agent, or Firm—Rader, Fishman & Grauer PLLC (57) ABSTRACT

An image scanning device having an image data correction function and a method for correcting image data of a scanned object are shown. The image scanning device for realizing image data of a scanned object includes a light source for providing a source light for the scanned object in order to obtain an optical image signal, a photo-detector for detecting and recording a scanning light intensity of the source light, and optical signal processing device for receiving and converting the optical image signal into an electronic image signal, the optical signal processing device being electrically connected to the photo-detector for reading the scanning light intensity of the source light, and adjusting the electronic image signal according to the scanning light intensity of the source light so as to realize the image data of the scanned object. The scanning operation of the image scanning device can be performed without warming up the light source.

18 Claims, 6 Drawing Sheets

IMAGE SCANNING DEVICE HAVING IMAGE DATA CORRECTION FUNCTION

FIELD OF THE INVENTION

The present invention is related to an image scanning device, and more particular to an image scanning device having an image data correction function for improving image quality and uniformity. The present invention also relates to a method for correcting image data of a scanned object.

BACKGROUND OF THE INVENTION

In general, an image scanning device picks up the image data of a scanned object though the following path. Light is emitted from a light source to the scanned object which reflects light therefrom or allows light to pass therethrough to a mirror set. The mirror set further reflects light to a lens set to be focused, and then the focused light is transmitted to a photoelectric converter such as a charge coupled device (CCD) for further processing. Owing to a long journey of the light from the light source to the photoelectric converter and a long journey of the above mentioned scanning devices from the start to the end during a scanning process, various errors may occur. In general, errors may result from the poor coordination among the cells in the photoelectric converter and the light source, and the $\cos^4\theta$ effect of the lens set. These errors can be compensated by performing a standard scanning process prior to a formal scanning process for calibration. In addition, errors may also be caused by the noises generated by the photoelectric converter, and so far, there is no way to compensate such an error unless the manufacturer of the photoelectric converter develops an improved device. Moreover, a source of error up to about 3%~5% is the uneven light emission of the light source at different time points. There has been no scanning device manufacturer taking action to compensate such an error yet.

SUMMARY OF THE INVENTION

An object of the present invention is to provide an image scanning device which is capable of compensating an error resulting from uneven light emission of the light source at different time points by the installation of a photo-detector.

Another object of the present invention is to provide a method for correcting image data of a scanned object, which provides optical data of the light source at different time points as references to correct the image data of the scanned object.

According to a first aspect of the present invention, an image scanning device for realizing image data of a scanned object includes a light source for providing a source light for the scanned object in order to obtain an optical image signal; a photo-detector for detecting and recording a scanning light intensity of the source light; and optical signal processing means for receiving and converting the optical image signal into an electronic image signal, the optical signal processing means being electrically connected to the photo-detector for reading the scanning light intensity of the source light, and adjusting the electronic image signal according to the scanning light intensity of the source light so as to realize the image data of the scanned object.

In a preferred embodiment, the optical signal processing means includes a photoelectric converter, e.g. a charge coupled device (CCD), for receiving and converting the optical image signal into the electronic image signal; and an operational processor electrically connected to the photoelectric converter and the photo-detector for reading the scanning light intensity and a reference light intensity which are recorded by the photo-detector at a scanning position and a reference position, respectively, and adjusting the electronic image signal according to the scanning light intensity and the reference light intensity. In this preferred embodiment, the operational processor adjusts voltage values of the electronic image signal according to a ratio of the scanning light intensity to the reference light intensity.

Preferably, the operational processor includes a divider electrically connected to the photo-detector for reading the scanning light intensity and the reference light intensity from the photo-detector to obtain the ratio; and a multiplier electrically connected to the divider and the photoelectric converter for adjusting the electronic image signal by multiplying the voltage values of the electronic image signal by the ratio, and more preferably, further includes a correction circuit electrically connected to the operational processor for correcting the adjusted electronic image signal according to voltage values of a standard measured at the beginning of a scanning process so as to precisely realize the image data of the scanned object.

If the system is operated digitally, the optical signal processing means should further include an analog/digital converter electrically connected to the photoelectric converter and the operational processor for converting voltage values of the electronic image signal into digital voltage values.

Generally, voltage values of the electronic image signal include respective voltage values of a red, a green and a blue colors in the electronic image signal.

If the image scanning device according to the present invention is a reflection type of scanner, the light source, the photo-detector, and the optical signal processing means are contained in a carriage to be moved together along a guiding track.

If the image scanning device according to the present invention is a transmission type of scanner, then the light source and the photo-detector are located on a side of the scanned object opposite to the optical signal processing means.

In accordance with a second aspect of the present invention, a method for adjusting scanned image data of an object according to the light intensity of a source light provided for the object during scanning, includes steps of: recording a reference light intensity of the source light detected at a reference position; recording a scanning light intensity of the source light detected at a scanning position; obtaining a calibration value according to the reference light intensity and the scanning light intensity; and adjusting the scanned image data of the object by an arithmetic operation between the scanned image data and the calibration value.

The scanned image data generally include voltage values of a red, a green and a blue colors.

According to a preferred embodiment of the present invention, the step c) of the method is executed on the basis of the formulae of d=A/B, in which d indicates the calibration value, A indicates the reference light intensity, and B indicates the scanning light intensity.

Furthermore, the step d) can be executed on the basis of the formulae of $$R_B = R_B' \times d$$

$$G_B = G_B' \times d$$

$$B_B = B_B' \times d$$

in which:

$R_B$, $G_B$ and $B_B$ indicate voltage values of a red, a green and a blue colors of the adjusted image data after the step d), respectively; and $R_B'$, $G_B'$ and $B_B'$ indicate voltage values of a red, a green and a blue colors of the scanned image data, respectively.

If the color effects of respective red, green and blue colors are to be further independently adjusted in addition to compensation, then a step e) of adjusting the scanned image data according to three parameters corresponding to color effects of a red, a green and a blue colors, respectively, can be executed.

The steps d) and e) can be executed on the basis of the formulae of $$R_B = R_B' \times d \times C_R$$

$$G_B = G_B' \times d \times C_G$$

$$B_B = B_B' \times d \times C_B$$

in which:

$R_B$, $G_B$ and $B_B$ indicate voltage values of a red, a green and a blue colors of the adjusted image data after the steps d) and e), respectively;

$R_B'$, $G_B'$ and $B_B'$ indicate voltage values of a red, a green and a blue colors of the scanned image data, respectively; and $C_R$, $C_G$ and $C_B$ indicate coefficients for further independently adjusting voltage values of a red, a green and a blue colors of the scanned image data, respectively.

Preferably, the method further includes steps of recording voltage values of a red, a green and a blue colors of a standard object, and correcting the voltage values of the adjusted image data after the step d) according to the voltage values of the standard object. This correction step, although not an essential step of the present invention, can further improve the image compensation effect of a scanned document. Such a correction step has been popularly used in the scanner field, and is well known to those skilled in the art, so it will not be redundantly described here.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
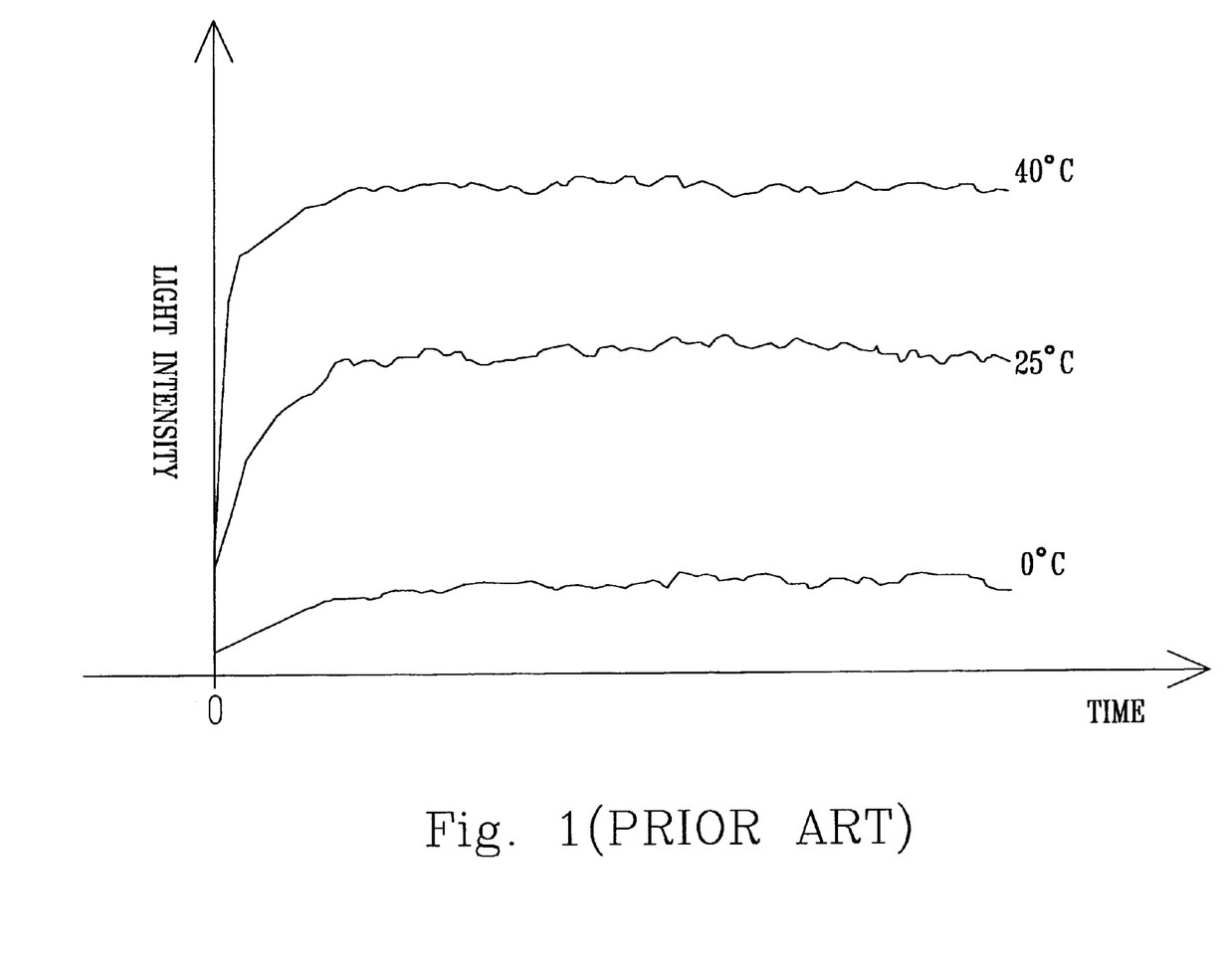
FIG. 1 is a light intensity vs. time plot showing the variation of emission light emitted by a light source with time.

As known to those skilled in the art, the intensity of light emitted by a light source varies with time under a certain environmental temperature, as shown in FIG. 1 which illustrates the variation of the intensity of the emitted light with time at 0° C., 25° C. and 40° C., respectively. While the light is weak at the beginning, it is getting stronger with time and become substantially stable finally. Accordingly, the image data obtained during a single scanning process will not be accurate and uniform. In other words, for a conventional image scanner, the scanning operation should not be performed until the light source has warmed up and stabilized. On the other hand, the variation curves of the intensity of the emitted light also vary with environmental temperatures and/or are influenced by the heat caused by the light source itself, as shown in FIG. 1, so that the required warm-up time of a scanner also varies. In order to solve this problem, the present invention provides an image scanning device which includes a photo-detector to monitor the light source so that the image data obtained at various scanning time points can be corrected or further adjusted in response to the intensity variation of the light emitted by the light source. Even if the scanning operation is performed before the light source has stabilized, the errors in light intensity at different time points can be compensated. Concretely, the scanning operation can be performed soon without warming up the light source. The image scanning device and the correcting method according to the present invention will be described in detail as follows.

Figure 2:
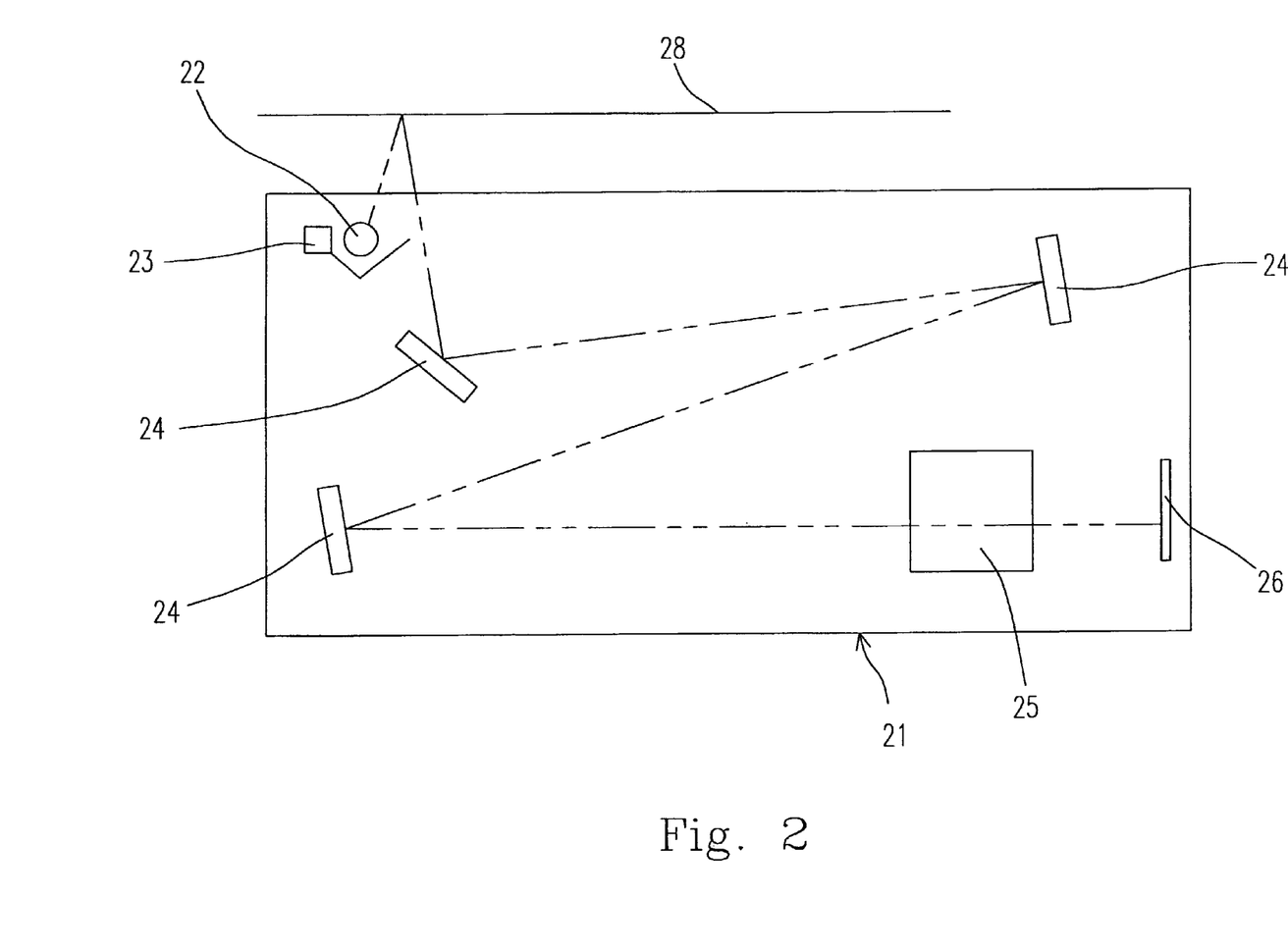
FIG. 2 is a schematic diagram showing a preferred embodiment of a reflection type of image scanner according to the present invention.
Figure 3:
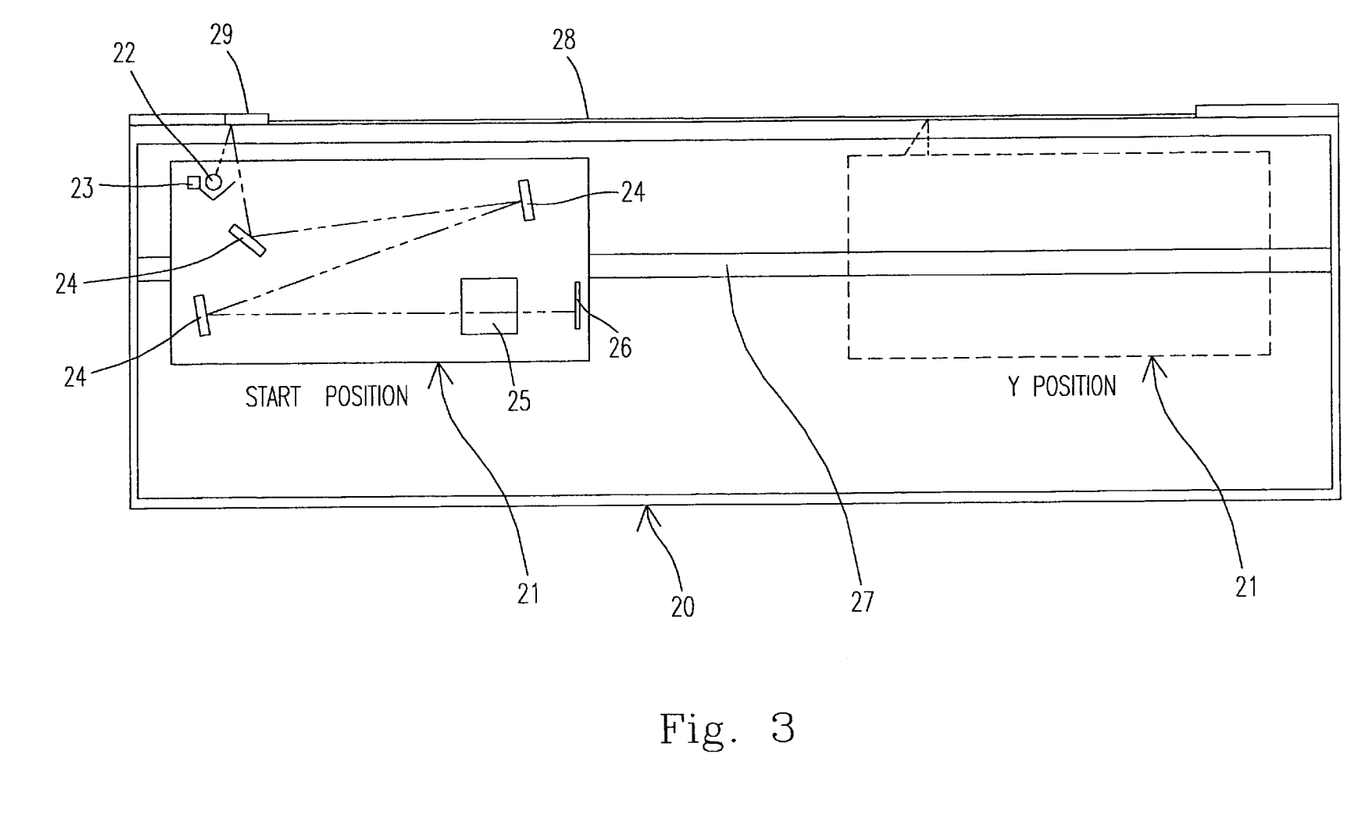
FIG. 3 schematically shows two positions of a carriage of the image scanner shown in FIG. 1, the starting position and a Y-position, respectively at two scanning time points.

Please refer to FIGS. 2 and 3 which schematically show a preferred embodiment of a reflection type of image scanner according to the present invention. The image scanner 20 includes a light source 22, a photo-detector 23, a reflective mirror set 24, a lens set 25 and optical signal processing means 26. These elements are generally contained in a carriage 21 to be moved together along a guiding track 27 so as to pick up image data of various parts of a scanned object. As shown in FIG. 2, when a document 28 is scanned, light is emitted from the light source 22 to the document 28 which reflects light therefrom to the mirror set 24. The mirror set 24 further reflects light to the lens set 25 to be focused, and then the focused light is transmitted to the optical signal processing means 26 to be recorded and further processed. Meanwhile, light is also emitted by the light source 22 to the photo-detector 23 to be recorded. As shown in FIG. 3, during the carriage 21 moves from the start of the scanning path toward the end of the scanning path along the guiding track 27, optical data of the light source 22 and image data of the document 28 are respectively realized by the photo-detector 23 and the optical signal processing means 26 at various scanning points, such as the start position and the Y-position shown in FIG. 2. Of course, it is known to those skilled in the art that a color calibration process is preferably performed prior to a formal scanning process for example by pre-scanning a standard paper 29 as standard white.

Figure 4:
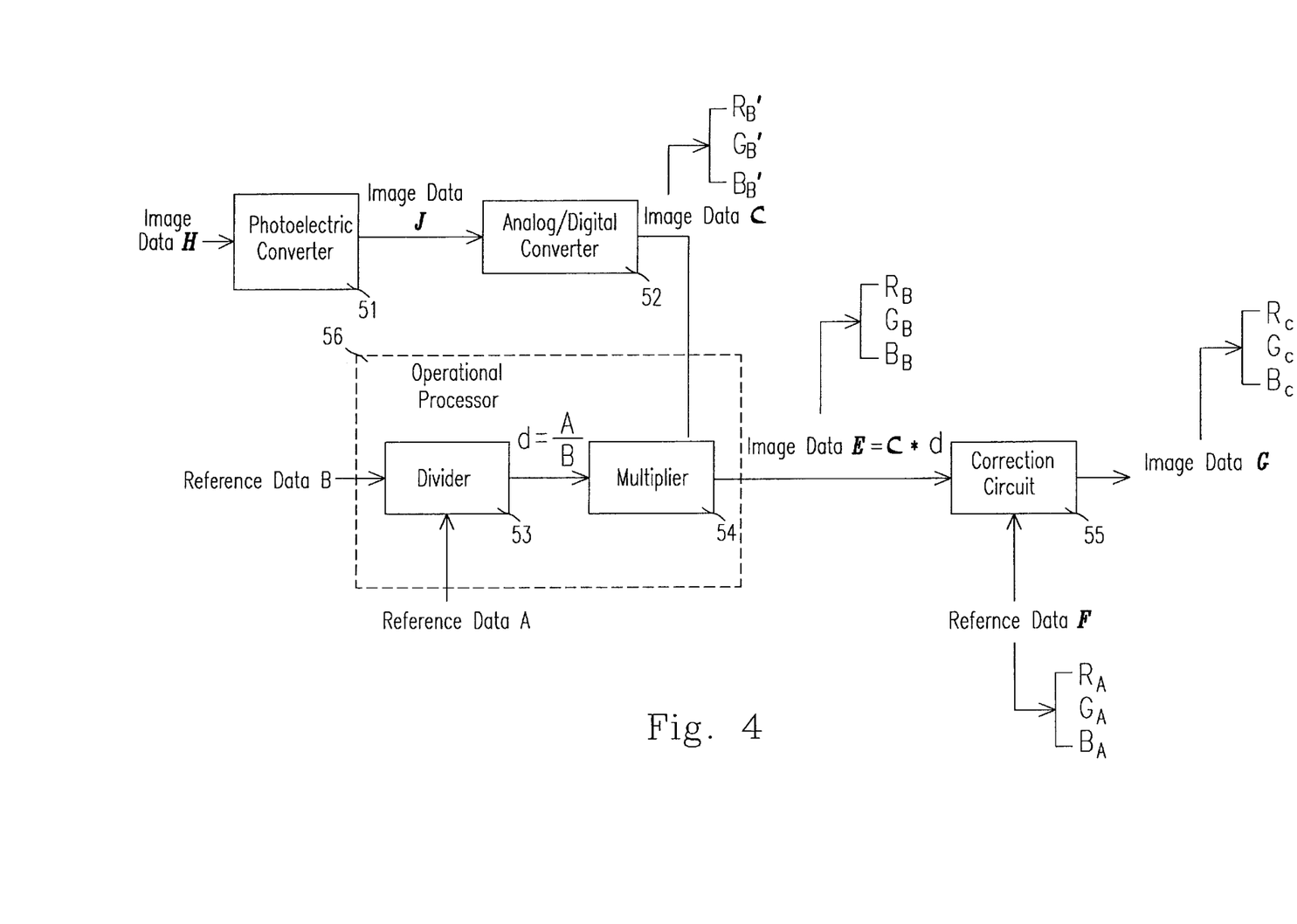
FIG. 4 is a schematic block diagram showing a preferred embodiment of optical signal processing means of the present image scanning device.

A preferred embodiment of optical signal processing means of the present image scanning device will be described hereinafter with reference to FIG. 4. The optical signal processing means shown in FIG. 4 includes a photoelectric converter 51, an analog/digital converter 52, an operational processor 56, and a correction circuit 55. The photoelectric converter 51 can be a charge coupled device (CCD) functioning as well known to those skilled in the art. The operational processor 56 is electrically connected to the photo-detector and is used to operate the outputs of the photo-detector and the photoelectric converter to realize desired image data. The operational processor 56 includes a divider 53 and a multiplier 54. The analog/digital converter 52 is used to convert the output of the photoelectric converter 51 into a digital signal when the operational processor 56 is of digital type, such as digital circuit, software or firmware. Of course, the analog/digital converter 52 will not be required if the operational processor 56 is of analog type. As to the correction circuit 55, it can be used to further correct the obtained image data in order to realize more accurate image data and express more even image effect of the scanned object. The reference data utilized by the correction circuit 55 can be the optical data obtained from the standard paper shown in FIG. 3.

In the present image scanner performing image-data correcting function by a photo-detector, the number of photo-detectors may also be greater than one depending on the correction method.

Figure 5:
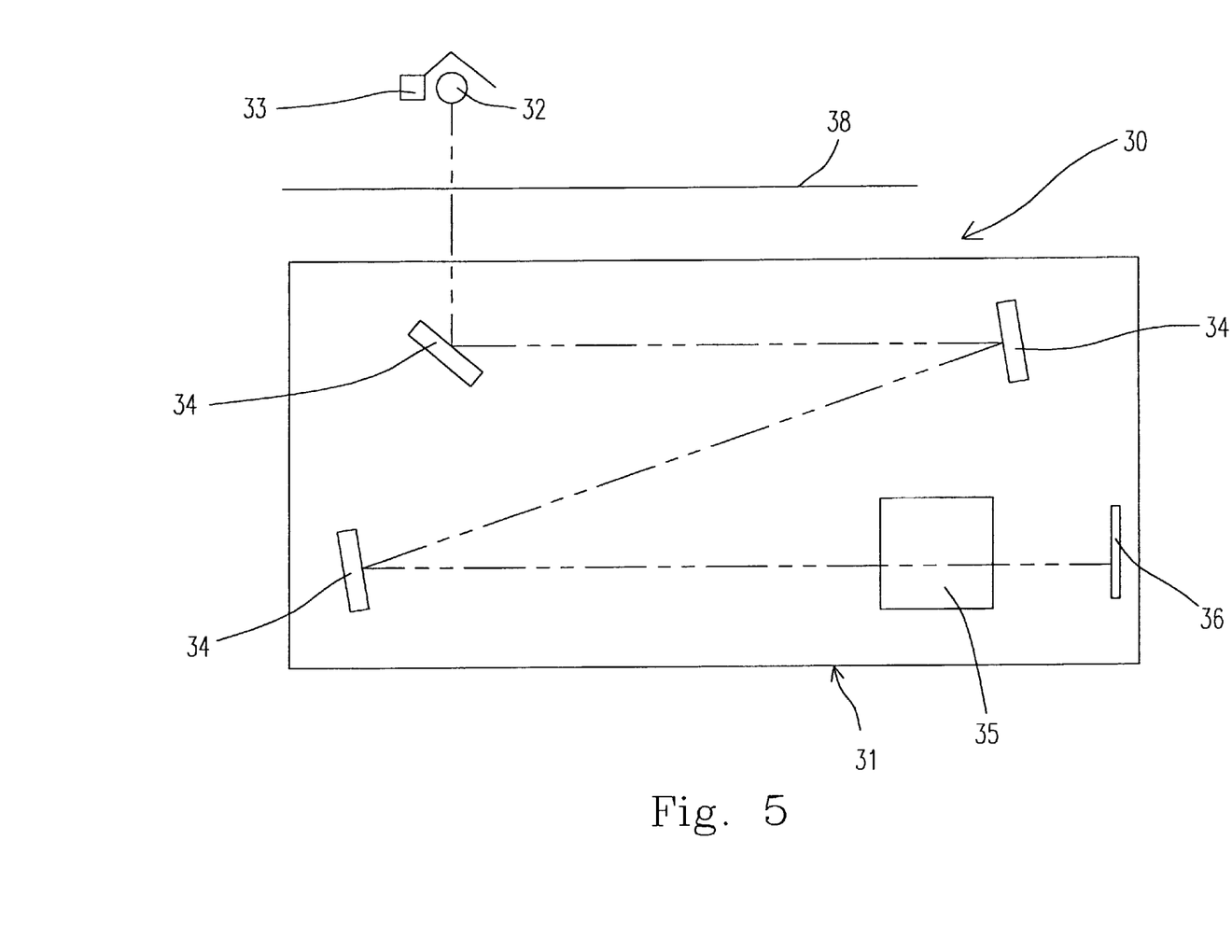
FIG. 5 is a schematic diagram showing a preferred embodiment of a transmission type of image scanner according to the present invention.

Although a reflection type of image scanner is taken as an example for illustrating the present invention, a transmission type of image scanner can also include a photo-detector to perform the image correction function as disclosed above. As shown in FIG. 5 and as anticipated to those skilled in the art, a transmission type of image scanner 30 according to the present invention principally differs from the reflection type of image scanner 20 in that the photo-detector 33 and the light source 32 thereof are located on a side of the document 38 opposite to the carriage 31 containing therein the mirror set 34, the lens set 35 and the optical signal processing means 36. The arrangement of the optical signal processing means shown in FIG. 4 can also be applied to the transmission type of image scanner 30.

Figure 6:
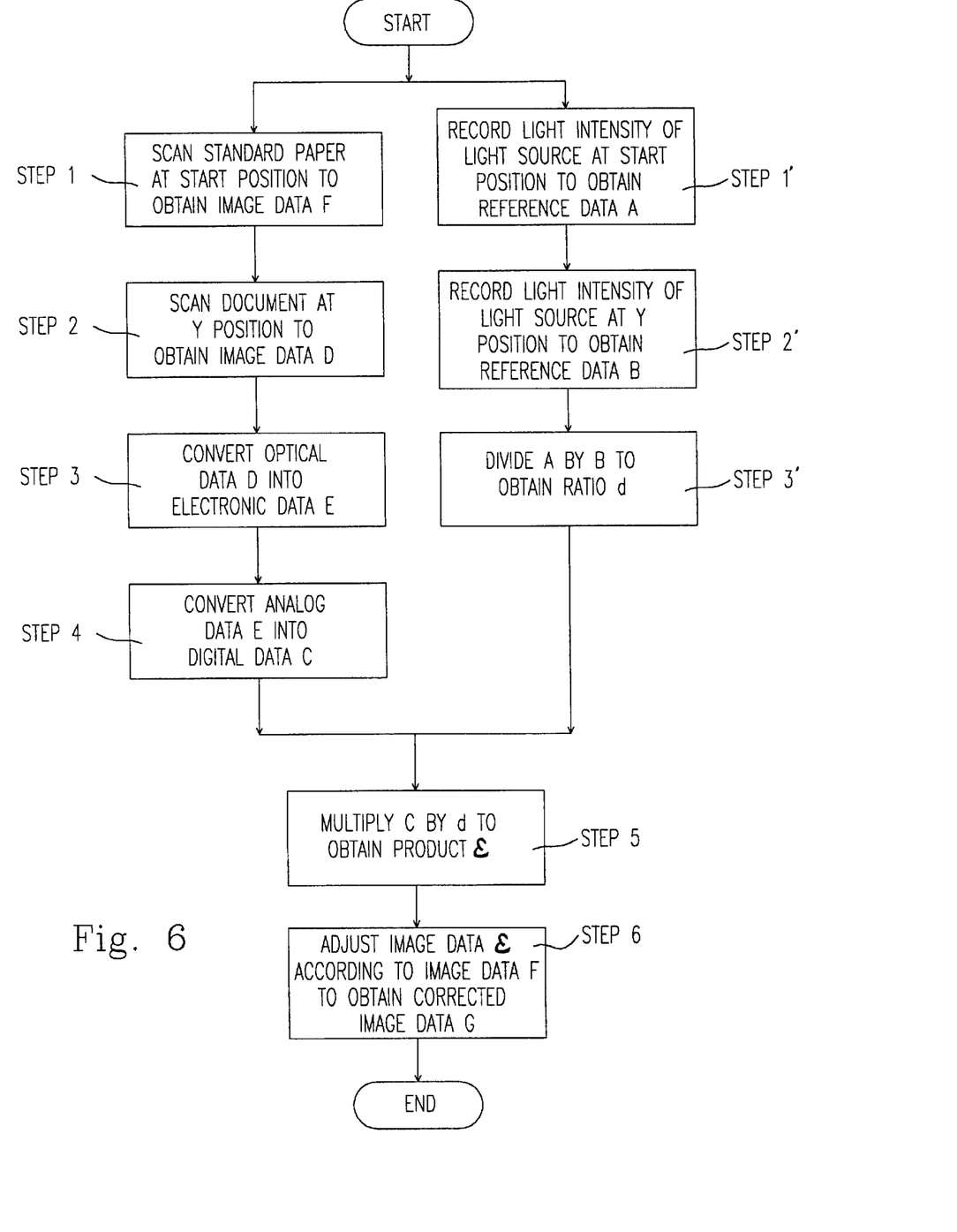
FIG. 6 is a flowchart illustratively showing the operation of an image scanner according to the present invention.

Hereinafter, the image-data correcting operations of the image scanning device according to the present invention will be described with reference to FIGS. 3, 4 and 6. It is to be noted that all the image data here are expressed as the voltage data of red, green and blue colors.

Step 1: at the beginning of a scanning process, the carriage 21 is located at a start position to scan the standard paper 29 to obtain the image data of the standard paper as reference data F, and as noted above, the reference data F includes voltage data $R_A$, $G_A$, $B_A$;

Step 1': the intensity of light emitted by the light source 22 is recorded as reference data A by the photo-detector 23 at the time Step 1 is executed;

Step 2: the carriage 21 moves forward to a Y position to scan a corresponding part of the document 28, wherein the Y position is any position in the scanning path, to obtain optical image data H of the scanned document 28 at the Y position;

Step 2': the intensity of light emitted by the light source 22 is recorded as reference data B by the photo-detector 23 at the time Step 2 is executed;

Step 3: the optical image data H are converted into electronic analog image data J by the photoelectric converter 51;

Step 4: the analog image data J is converted into digital image data C by the analog/digital converter 52, and as noted above, the image data C includes voltage data $R_B'$, $G_B'$, $B_B'$;

Step 3': the reference data A and the reference data B are operated in the divider 53 to obtain a ratio d of A to B;

Step 5: the ratio d and the image data C are operated in the multiplier 53 to obtain a product E of C and d, and as noted above, the image data E includes voltage data $R_B$, $G_B$, $B_B$; and Step 6: the image data ε is further processed in the correction circuit 55 according to the reference data F in any manner well known to those skilled in the art to obtain the corrected image data G of the document 28 at the Y position, and as noted above, the image data G includes voltage data $R_C$, $G_C$, $B_C$.

From the above description, it will be understood that the correction of the image data of the scanned object is executed according to the following formulae:

$$R_B=R_B'\times d$$

$$G_B=G_B'\times d$$

$$B_B=B_B'\times d$$

Although the major object of the present invention is to correct the image data errors resulting from the unstable light intensity of the light source, the image data should be able to be further modified in case that the red, green and blues color expressions for the scanned object are to be separately further adjusted rather than merely compensated. In other words, coefficients $C_R$, $C_G$ and $C_B$ for adjusting red, green and blues color expressions for the scanned object, respectively, can be further applied to the formulae, i.e.

$$R_B=R_B'\times d\times C_R$$

$$G_B=G_B'\times d\times C_G$$

$$B_B=B_B'\times d\times C_B$$

It is apparent from the above formulae that the coefficients $C_R$, $C_G$ and $C_B$ can all be set to equal to unity when an original color distribution is to be expressed. On the contrary, a certain color effect can be strengthened or lightened by setting different coefficients $C_R$, $C_G$ and $C_B$.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanning device for realizing image data of a scanned object, comprising:
    a light source for providing a source light for said scanned object in order to obtain an optical image signal;
    a photo-detector mounted around said light source to directly receive a part of said source light, and synchronously moved together with said light source for detecting and recording light intensities of said source light at a reference position where said source light has not reached said scanned object, and a scanning position where said source light is provided for a scan line of said scanned object as a reference light intensity and a scanning light intensity, respectively; and optical signal processing means for receiving and converting said optical image signal into an electronic image signal, said optical signal processing means being a predetermined light path distant from said light source and thus said photo-detector and electrically connected to said photo-detector for reading said reference and scanning light intensities from said photo-detector, and adjusting said electronic image signal according to the variation from said reference light intensity to said scanning light intensity of said source light so as to realize said image data of said scanned object.

2. The image scanning device according to claim 1 wherein said optical signal processing means includes:

a photoelectric converter for receiving and converting said optical image signal into said electronic image signal; and an operational processor electrically connected to said photoelectric converter and said photo-detector for reading said scanning light intensity and said reference light intensity, and adjusting said electronic image signal according to a ratio of said scanning light intensity to said reference light intensity.

3. The image scanning device according to claim 2 wherein said operational processor adjusts voltage values of said electronic image signal according to said ratio of said scanning light intensity to said reference light intensity.

4. The image scanning device according to claim 3 wherein said operational processor includes:

a divider electrically connected to said photo-detector for reading said scanning light intensity and said reference light intensity from said photodetector to obtain said ratio; and a multiplier electrically connected to said divider and said photoelectric converter for adjusting said electronic image signal by multiplying said voltage values of said electronic image signal by said ratio.

5. The image scanning device according to claim 4 wherein said optical signal processing means further includes a correction circuit electrically connected to said operational processor for correcting said adjusted electronic image signal according to voltage values of a standard measured at the beginning of a scanning process so as to precisely realize said image data of said scanned object.

6. The image scanning device according to claim 3 wherein said optical signal processing means further includes an analog/digital converter electrically connected to said photoelectric converter and said operational processor for converting voltage values of said electronic image signal into digital voltage values.

7. The image scanning device according to claim 3 wherein voltage values of said electronic image signal include respective voltage values of a red, a green and a blue colors in said electronic image signal.

8. The image scanning device according to claim 2 wherein said photoelectric converter is a charge coupled device (CCD).

9. The image scanning device according to claim 1 wherein said image scanning device is a reflection type of scanner.

10. The image scanning device according to claim 9 wherein said light source, said photo-detector, and said optical signal processing means are contained in a carriage to be moved together along a guiding track.

11. The image scanning device according to claim 1 wherein said image scanning device is a transmission type of scanner, and said light source and said photo-detector are located on a side of said scanned object opposite to said optical signal processing means.

12. A method for adjusting scanned image data of an object according to the light intensity variation of a single source light provided for said object during scanning, comprising steps of:

a) recording a reference light intensity of a single source light detected at a reference position;

b) recording scanned image data of said object at a scanning position, and recording a scanning light intensity of said single source light detected at said scanning position;

c) obtaining a calibration value by dividing said reference light intensity by said scanning light intensity; and d) adjusting said scanned image data of said object at said scanning position by an arithmetic operation between said scanned image data and said calibration value.

13. The method according to claim 12 wherein said scanned image data include voltage values of a red, a green and a blue colors.

14. The method according to claim 13 wherein said step d) is executed on the basis of the formulae of $$R_B = R_B' \times d$$

$$G_B = G_B' \times d$$

$$B_B = B_B' \times d$$

in which:

d indicates said calibration value;

$R_B$, $G_B$ and $B_B$ indicate voltage values of a red, a green and a blue colors of said adjusted image data after said step d), respectively; and $R_B'$, $G_B'$ and $B_B'$ indicate voltage values of a red, a green and a blue colors of said scanned image data, respectively.

15. The method according to claim 14 further comprising steps of recording voltage values of a red, a green and a blue colors of a standard object, and further correcting said voltage values of said adjusted image data after said step d) according to said voltage values of said standard object.

16. A method for adjusting scanned image data of an object according to the light intensity variation of a single source light provided for said object during scanning, comprising steps of:

a) recording a reference light intensity of a single source light detected at a reference position;

b) recording scanned image data of said object at a scanning position, and recording a scanning light intensity of said single source light detected at said scanning position;

c) obtaining a calibration value by dividing said reference light intensity by said scanning light intensity;

d) compensating said scanned image data of said object at said scanning position by an arithmetic operation between said scanned image data and said calibration value; and repeating said steps b) to d) at other different scanning positions until completing scanning.

17. The method according to claim 16 wherein said scanned image data include voltage values of a red, a green and a blue colors, and the method further includes steps of recording voltage values of a red, a green and a blue colors of a standard object, which are used to further correct said voltage values of said compensated image data after said step d).

18. The method according to claim 17 wherein said standard object is located at said reference position upstream of said scanning position.

* * * * *

UNITED STATES PATENT AND TRADEMARK OFFICE
CERTIFICATE OF CORRECTION

PATENT NO.      : 6,516,101 B1                                                   Page 1 of 1
DATED           : February 4, 2003
INVENTOR(S)     : Jenn-Tsiar Tsai It is certified that error appears in the above-identified patent and that said Letters Patent is hereby corrected as shown below:

Column 7,
Line 32, change "photodetector" to -- photo-detector --.

Signed and Sealed this

Eighth Day of July, 2003

JAMES E. ROGAN
*Director of the United States Patent and Trademark Office*